US00RE39658E

(19) United States
(12) Reissued Patent
Carlson et al.

(10) Patent Number: US RE39,658 E
(45) Date of Reissued Patent: May 29, 2007

(54) BALL VALVE WITH MODIFIED CHARACTERISTICS

(75) Inventors: Bengt A. Carlson, Stamford, CT (US); Werner A. Buck, Ridgefield, CT (US)

(73) Assignee: Belimo Air Control (USA) Inc., Danbury, CT (US)

(21) Appl. No.: 09/641,101

(22) Filed: Aug. 17, 2000

Related U.S. Patent Documents

Reissue of:
(64) Patent No.: 6,039,304
Issued: Mar. 21, 2000
Appl. No.: 09/084,698
Filed: May 26, 1998

U.S. Applications:
(62) Division of application No. 09/404,739, filed on Sep. 24, 1999, now abandoned.
(60) Provisional application No. 60/062,010, filed on Aug. 1, 1997.

(51) Int. Cl.
*F16K 5/10* (2006.01)

(52) U.S. Cl. ..... 251/209; 251/118
(58) Field of Classification Search ..... 251/205, 251/206, 207, 208, 209, 118, 309, 315.16, 251/315.01; 137/269
See application file for complete search history.

(56) References Cited

U.S. PATENT DOCUMENTS

| | | | | |
|---|---|---|---|---|
| 915,543 | A | 3/1909 | Billiard | |
| 1,175,328 | A | 3/1916 | Wright | |
| 1,454,222 | A | 5/1923 | Palmer et al. | |
| 1,622,406 | A | 3/1927 | Wilhjelm | |
| 1,972,151 | A | 9/1934 | Link | 251/91 |
| 2,115,675 | A | 4/1938 | Tremmel | 251/92 |
| 2,699,555 | A | 1/1955 | Green | 4/288 |
| 2,707,971 | A | 5/1955 | Lamar | 137/599.2 |
| 3,146,792 | A | 9/1964 | Donnelly et al. | 137/614.17 |
| 3,386,461 | A | 6/1968 | Fisher | 137/237 |
| 3,542,337 | A | 11/1970 | Scaramucci | 251/209 |
| 3,542,338 | A | 11/1970 | Scaramucci | 251/209 |
| 3,563,511 | A | 2/1971 | Bentley-Leek | 251/209 |
| 3,707,161 | A | 12/1972 | Crawford | 137/269 |
| 3,786,837 | A | 1/1974 | Pipkins | 137/625.32 |
| 3,880,191 | A | 4/1975 | Baumann | 137/625.32 |
| 3,987,819 | A | 10/1976 | Scheuermann | 137/637.3 |
| 4,085,774 | A | 4/1978 | Baumann | 137/625.3 |
| 4,111,229 | A | 9/1978 | Christian | 137/614.17 |
| 4,111,392 | A | 9/1978 | Edelmann | 137/454 |

(Continued)

OTHER PUBLICATIONS

Flow Characteristics and Installed Flow Characteristics, pp. 166–167 unknown source.
Flow–Tek, Inc., Control Ball Series—Model VC Product Brochure.
Toyo, Auto Three–Flow Product Brochure.
Worcester Controls publication entitled "Advanced Ball Control Valves for High Performance Throttling Applications" printed Feb. 1992.
Chapter entitled Heating, Ventilating and air Conditioning Control Systems, pp. 627–629, unknown source.
Publication of Worcester Controls entitled, "Advanced Ball Control Valves for High Performance Throttling Applications" printed Feb. 1992.

*Primary Examiner*—Eric Keasel
(74) *Attorney, Agent, or Firm*—Thaddius J. Carvis

(57) ABSTRACT

A valve according to the invention having a disk with a shaped opening and one side interfacing with and conforming to the shape of the exterior of the ball or plug. The disk fits inside the port at the seat area, and is secured by a ring. The ring can be threaded into the connection for the fluid pipe line. Alternatively, the connection can have a groove for an internal retaining ring. The disk is positioned so it interacts with the hole in the ball, in such a way that the desired flow characteristics are accomplished.

9 Claims, 3 Drawing Sheets

U.S. PATENT DOCUMENTS

| | | | | |
|---|---|---|---|---|
| 4,130,128 | A | | 12/1978 | Kaneko ..... 137/269 |
| 4,161,307 | A | | 7/1979 | Clinch et al. ..... 251/206 |
| 4,193,580 | A | | 3/1980 | Norris et al. ..... 251/309 |
| 4,226,263 | A | | 10/1980 | Muchow ..... 137/614.17 |
| 4,271,866 | A | | 6/1981 | Bey ..... 137/625.3 |
| 4,540,025 | A | | 9/1985 | Ledeen et al. ..... 137/625.32 |
| 4,889,163 | A | | 12/1989 | Engelbertsson ..... 137/625.32 |
| 4,989,833 | A | | 2/1991 | Polon ..... 251/209 |
| 5,074,522 | A | | 12/1991 | Reynolds et al. ..... 251/127 |
| 5,135,019 | A | | 8/1992 | Dupont ..... 137/15 |
| 5,509,446 | A | | 4/1996 | Bey ..... 137/625.32 |
| 5,551,467 | A | | 9/1996 | Booth et al. ..... 137/1 |
| 5,593,135 | A | | 1/1997 | Lester et al. ..... 132/271 |
| 5,937,890 | A | * | 8/1999 | Marandi ..... 251/209 X |

* cited by examiner

BALL VALVE WITH MODIFIED CHARACTERISTICS

Matter enclosed in heavy brackets [ ] appears in the original patent but forms no part of this reissue specification; matter printed in italics indicates the additions made by reissue.

*RELATED APPLICATIONS*

*This application is a Reissue of U.S. Pat. No. 6,039,304 which claims priority to U.S. Provisional Patent Application Ser. No. 60/062,010 filed Aug. 1, 1997. A divisional U.S. Patent Application Ser. No. 09/404,739 remains pending.*

FIELD OF THE INVENTION

The present invention primarily pertains to control valves used to control the supply of hot or chilled fluid (especially water) to the heat transfer devices used in the heating/ventilation/air conditioning systems in buildings (commonly referred to as the HVAC system). These control valves are generally operated by actuators, which are connected to the temperature control system. The valves are modulated to any suitable intermediate position, so a flow rate that produces the desired temperature is supplied.

BACKGROUND OF THE INVENTION

The flow capacity of the subject control valves must be selected so as to be suitable for each control object. Also, the flow characteristics of the valves must be compatible with the heat transfer characteristics of the control object. Basic ball valves or plug valves have a certain inherent flow characteristic not ideally suited for the above mentioned applications. Also, the flow capacity of such valves, as compared to the size of the valve, is very high. The use of reducing couplings and installing a valve with a smaller size than the basic pipe size tends to further distort the valve characteristics.

U.S. Pat. No. 4,193,580 describes a plug valve which has a special body shape. Among other things, there is brief mention in the patent of ports and seats with a specially shaped opening to give the valve desired flow characteristics. One advantage with the valve disclosed in the '580 patent is that the special opening or seat can be exchanged with another seat which has a differently shaped opening and therefore, gives the valve a different flow capacity and/or flow characteristics. This makes it possible to adapt the disclosed valve for a specific control object. However, in order to change the seats, the valve body has to be taken apart. Therefore, valves that are bolted together and easy to open are preferred, or even necessary, for practice of the disclosure. So called "three piece" ball valves are especially well suited. The three pieces are bolted together, providing easy access to the seats.

A significant disadvantage of the plug valve taught in the '580 patent is that the HVAC market is in general very price sensitive, and therefore relatively inexpensive "two piece" ball valves are often used. The two pieces of such valves are screwed together, and the threads are secured by an epoxy or similar substance. This makes it very difficult (indeed, practically impossible) to take the valve apart in order to exchange the seats. Specifically, if a "two piece" valve is taken apart and reassembled in the field, there is a risk that it may be tightened too little or too much. This will either cause leakage through the seats, or an excessive torque to operate the valve.

An important consideration is that the above mentioned specially shaped seat has to perform two functions. It must provide a tight shut-off when the valve is closed and also provide the desired flow characteristics, when the valve is operated between opened and closed. What is desired, therefore, is a control valve which is inexpensive to manufacture, which is quick and easy to install and change, and which has flow capacity and flow characteristics which can be easily changed without disturbing the integrity of the valve seal.

SUMMARY OF THE INVENTION

Accordingly, it is an object of the present invention to provide an improved control valve in which its flow capacity and flow characteristics can be easily changed, without having to take the valve apart. Thereby, the integrity of the valve seals will remain intact, and the time consuming operation of taking the valve apart and reassembling it is eliminated.

Another object of the invention is to separate the shut off (sealing) function of the valve from the function that determines the flow coefficient and flow characteristics.

A further object is that when a valve is replaced, the device that determines the flow coefficient and characteristics can be transferred to the new valve.

It is still another object of the present invention to provide a control valve which is inexpensive to manufacture and which can be quickly and easily assembled.

It is still another object of the present invention to provide a control valve which has flow capacity and flow characteristics which can be easily changed without disturbing the integrity of the valve seal.

To overcome the deficiencies of the prior art and to achieve the objects and advantages listed above, a ball valve is disclosed which is slightly modified so it can retain a disk which has a specially shaped opening. The disk is inserted into one of the connection ports of the valve, where it is fastened by a retaining ring or similar device known in the art. The surface of the disk that faces the valve advantageously is concave and corresponds to the spherical surface of the ball inside the ball valve. The disk is preferably mounted with its concave surface very close to the surface of the ball. The disk has an opening (which can be described as generally or essentially V-shaped, although the walls of the opening are not perfectly straight, but, rather, somewhat convex) which interacts with the hole through the ball in such a way that the desired flow coefficient and flow characteristics (typically "equal percent" although other flow characteristics may be desired and achieved) are accomplished, when the ball is turned between the closed and open position.

In another embodiment of the present invention the disk is spring loaded, so it rests upon the ball. This reduces any unwanted flow that passes between the disk and the ball, so essentially the entire flow through the valve is controlled by the opening in the ball and the opening in the disk.

A further embodiment comprises a control valve having a disc having a surface facing the ball, wherein the disc surface is concave as described above, wherein the ball valve has a reduced size port. In a reduced port ball valve the largest diameter of the hole through the ball is smaller than the largest diameter of the hole in the port and seat in the valve body. The reduced size port eliminates the risk that the disk moves into the hole through the ball, when the valve is fully open.

As an alternative, the concave side of the disk can be slightly cantered (one side thicker than the opposed side).

This has the effect that the disk only partially rests upon the ball, so any unwanted flow between the disk and ball is minimized when the valve begins to open. The cantered shape makes it possible to use a full ported valve without the risk that the valve will lock up, so it no longer can be operated. (A full ported ball valve has a hole through the ball of the same diameter as the diameter of the port and seat in the valve body.)

The invention and its particular features and advantages will be better understood and its advantages will become more apparent from the following detailed description, especially when read in light of the attached drawings.

DETAILED DESCRIPTION OF THE INVENTION

Figure 1:
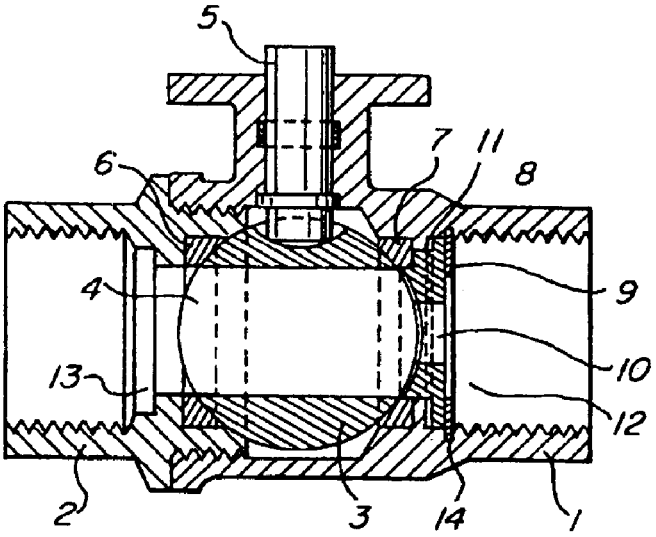
FIG. 1 shows a cross sectional view of a valve 100, taken along line 1—1 of FIG. 2, valve 100 constructed in accordance with the present invention.
Figure 2:
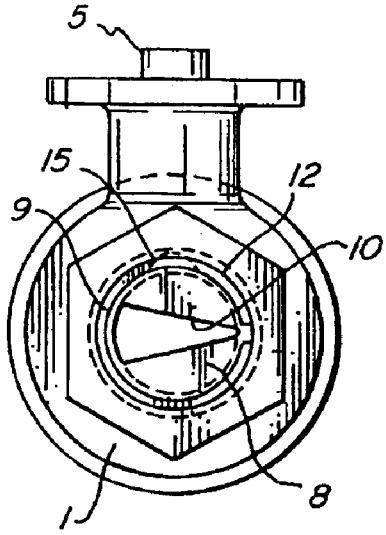
FIG. 2 is an end plan view of the valve 100 shown in FIG. 1, showing some elements thereof in phantom.
Figure 3:
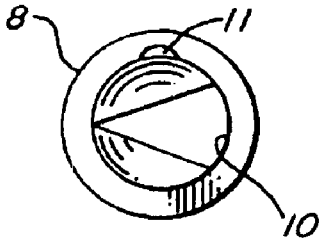
FIG. 3 is a plan view of a first end of a disk 8 housed inside valve 100, shown in FIG. 1.

Referring to FIGS. 1–2 in detail, the present invention relates to a valve 100 having modified, and modifiable flow capacity and characteristics. As used herein, the term "front" refers to the "upstream" end of the valve 100, as that term would be understood by the skilled artisan, and the term "rear" refers to the "downstream" end of the valve 100.

Although this description is written in terms of valves used in conjunction with fluid flow, especially liquid (i.e., water) flow in HVAC systems, it will be recognized that it is equally applicable to valves in a variety of applications, where modification of flow capacity and/or flow characteristics without the need for disassembly and reassembly of the valve is desired. Additionally, although this specification is written in terms of ball valves, it should be recognized that the invention, and principles relating thereto, is equally applicable to plug valves.

Moreover, it will be recognized that some or all of the attached drawings are schematic representations for purposes of illustration only and do not necessarily depict the actual relative sizes or locations of the elements shown. In addition, for the sake of convenience, not all elements are necessarily shown or numbered in all drawings.

It should be understood that at least four preferred embodiments are shown in FIGS. 1–8. In each of the Figures, like elements are represented with like reference numerals. For example, although different embodiments of a disk are shown, each disk is represented with reference numeral 8.

As shown in FIGS. 1–5, valve 100 comprises main body 1; screw-in body 2; ball 3; hole 4; shaft 5; downstream seat 6; upstream seat 7; disk 8; retaining ring 9; opening 10; key 11; upstream port 12; downstream port 13; groove 14; and recess 15 (FIG. 2). When assembled together, the main body 1 and the screw-in body 2 forms a casing, which has connections for the fluid pipe line. The casing has at least two openings connected to a fluid pipe line (not shown) and has an internal cavity which forms a valve chamber with an upstream port 12 and a downstream port 13 for defining a fluid flow path through the chamber. The valve chamber contains the ball 3 and the seats 6 and 7.

A ball or plug 3 is mounted in the valve chamber and has an exterior surface and two ends and a fluid passageway 4 extending between the ends and through the plug 3. The plug also comprises an axis of rotation extending transverse to the direction of the fluid flow passageway 4. The plug 3 is rotatable about the axis of rotation for selectively turning the plug between an open position in which the fluid flow passageway 4 is disposed along the fluid flow path of valve 100. In the closed position the passageway 4 is disposed transverse to the fluid flow path of valve 100.

Referring in detail to FIG. 1, the present invention uses a standard ball valve 100, which has conventional ring-shaped seats of a resilient material. In the text and figures, the direction of flow is described to be from the upstream 12 port to the downstream port 13. The flow can be reversed, and disk 8 can be mounted and retained at either the upstream 12 or downstream port 13. It is also possible to use two disks, i.e., to mount and retain a disk 8 at both ports.

Figure 4:
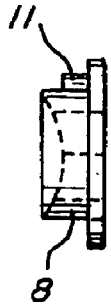
FIG. 4 is a plan view of the side of the disk 8 shown in FIG. 3, showing some elements thereof in phantom.

Disk 8, as taught by the present invention, has an opening 4 therein that is specially shaped to produce a desired flow capacity and flow characteristics. Disk 8 is inserted into the valve 100 and secured therein. In the preferred embodiment, and as best shown in FIGS. 1, 4, one side of the disk 8 is concave with a curvature approximating that of the exterior spherical surface of ball 3 (in plug valves this shape is generally semicircular). The disk 8 is inserted into the upstream port 12 (for example) and secured by a suitable device, such as a retaining ring 9 adjacent to the seat 7 area. The disk 8 fits the inside diameter of the seat 7 as closely as possible, and the concave surface of the disk 8 follows the spherical curvature of the surface of the ball 3 at a very close distance.

It should be understood that disk 8 is described as concave because it is desired that its exterior surface closely approximate the exterior surface of ball 3. This has been done for convenience only. It should be further understood that if the plug took on a different shape, then the disk would take on a corresponding different shape, but nonetheless a shape that closely approximated the shape of the plug.

In the disk 8 there is a specially shaped opening 10, which interacts with the hole 4 in the ball 3, so the desired flow characteristics is accomplished when the ball 3 is turned between the closed and open positions. In the preferred embodiment, shown in FIGS. 3, 5, the opening is essentially V-shaped. The opening inside the disk 8 interacts with the fluid passageway extending between the ends of the plug or ball 3 so that different flow characteristics are achieved when the plug 3 is moved between the open and closed positions.

Referring to FIG. 1, near the seat 7 area there is a groove 14 in the main body 1 of valve 100. The groove 14 is sized and shaped to secure the retaining ring 9 in its proper position. Alternatively, it is possible to place the groove 14 in the screw in-body 2. It is important to install the disk 8 correctly, so the opening 10 can interact with the hole 4 in the ball 3 to accomplished the desired result. This can simply be done by positioning the disk 8 correctly when it is secured by the retaining ring 9. In order to avoid mistakes and positively secure the position of the opening 10 in the disk 8, the following can be done. The disk 8 can be provided with a key 11, and the main body 1 is provided with a corresponding recess 15 (FIG. 2). The key 11 (FIG. 1) and the recess 15 (FIG. 2) determine the position of the disk 8, and thereby the position of the opening 10, so the disk 8 can not be rotated versus the rest of the valve 100. It is of course possible that, instead, the disk 8 has the recess and the main body 1 has the key; other variations would be apparent to those skilled in the art.

In another preferred embodiment not shown in the drawings, the disk 8 could be mounted in the screw-in body 2. However, the position of the recess 15 is dependent upon how hard the screw-in body 2 is tightened. Therefore, the location of the recess 15 must be planned, so it ends up at a predetermined position when the screw-in body 2 is screwed in and tightened correctly. Of course, it is instead possible to use no key and recess and just mount the disk 8 positioned correctly.

In the simplest form of the invention, there is a slight clearance between the disk 8 and the curvature of the ball 3. However, the clearance should preferably be as small as the production tolerances allow. The smaller the clearance is, the better the rangeability will be (the unwanted flow through the clearance will compromise the rangeabliltiy of the valve, especially at first, when the valve begins to open. The smaller the unwanted flow, the better the rangeability will be).

Figure 5:
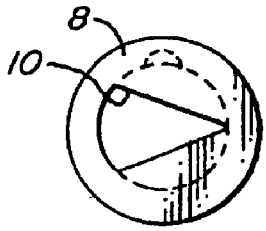
FIG. 5 is a plan view of a second end of the disk 8 shown in FIG. 3.

Typically, as best shown in FIGS. 1, 5, the opening 10 in the disk 8 has one pointed narrow end. It is especially important that the clearance is very small at this end. In order to reduce the clearance, the disk 8 can be spring loaded so it presses against the ball 3. When the valve 100 is fully open, the spring action may move the disk 8 a little bit into the opening 4 of the ball, if valve 100 is a fullported valve. It is possible that this may lock the valve 100, so it can no longer be operated. This can be avoided by limiting the movement of the ball 3 so that it can not open fully. For example, the movement of ball 3 can be stopped a few degrees before the fully open position. The shaft 5 that turns the ball 3 can have a small arm that makes contact with a protrusion on the body at the desired angle to accomplish this.

Figure 8:
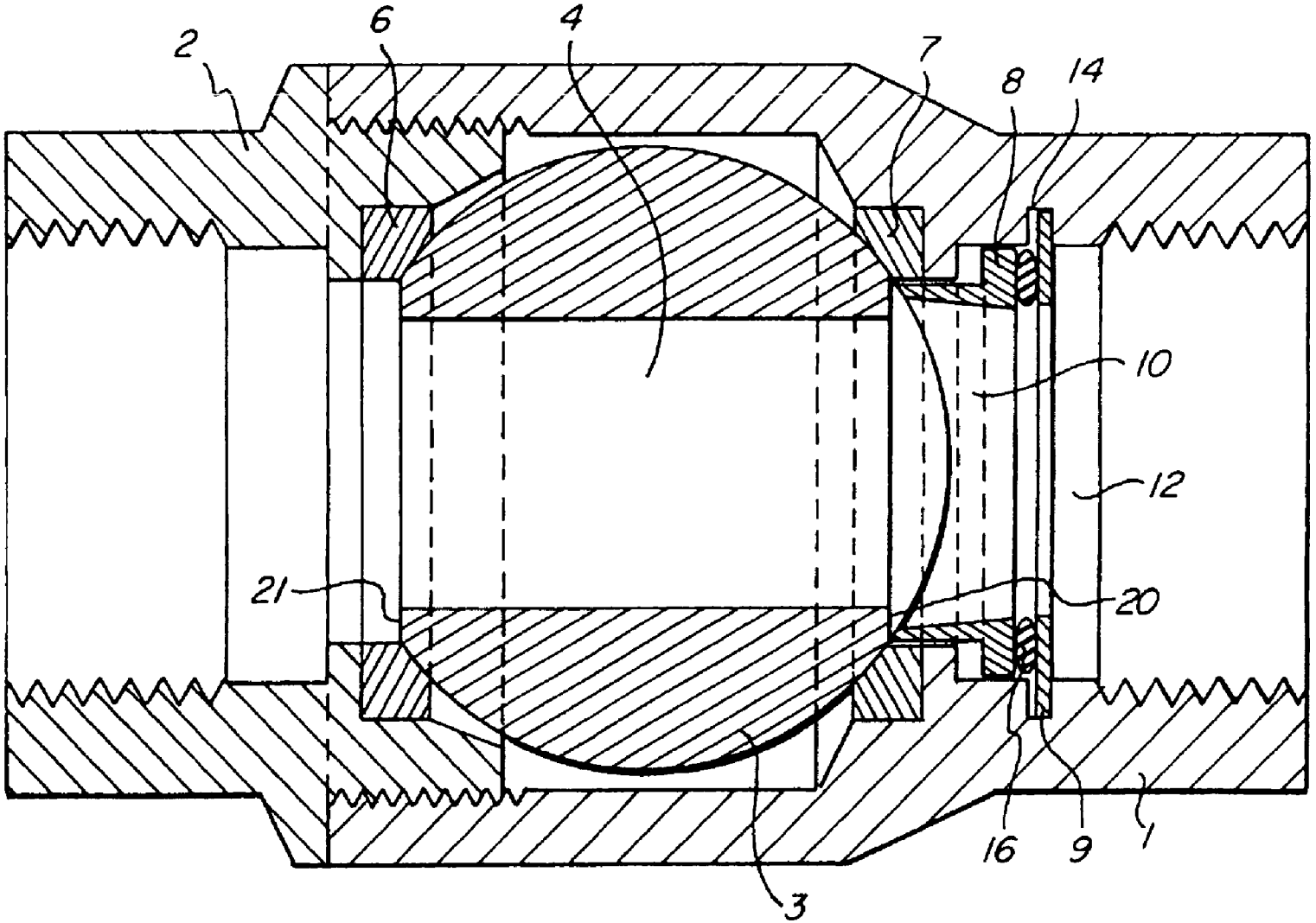
FIG. 8 is a top cross section view of another preferred embodiment of a valve 106, wherein the diameter of hole 4 through ball 3 is smaller than the smallest diameter of disk 8.

An alternative solution is shown in FIG. 8. It uses a ball valve 106 with a reduced port. The hole 4 through the ball 3 has a smaller diameter than the smallest diameter of the disk 8. Therefore, the disk 8 can not fit into the hole 4 of the ball 3. A small reduction in the size of the hole 4 is enough.

The hole 4 can begin and end directly at the spherical surface of the ball 3. However, it is more advantageous if the ball 3 has a flat surface 20 at the end of the hole 4 where the disk 8 is located. The flat surface 20 should have an outside diameter approximately the same as the disk 8. A single flat surface 20 can be employed. However, two flat surfaces 20, 21 are shown in FIG. 8. This is preferred because it prevents the downstream seat 6 from closing ahead of the upstream seat 7. Also, the ball 3 will be symmetrical so it can be installed in any way. The flat surfaces 20, 21 increase the portion of the angular movement of the ball 3 over which the flow is controlled.

Figure 6:
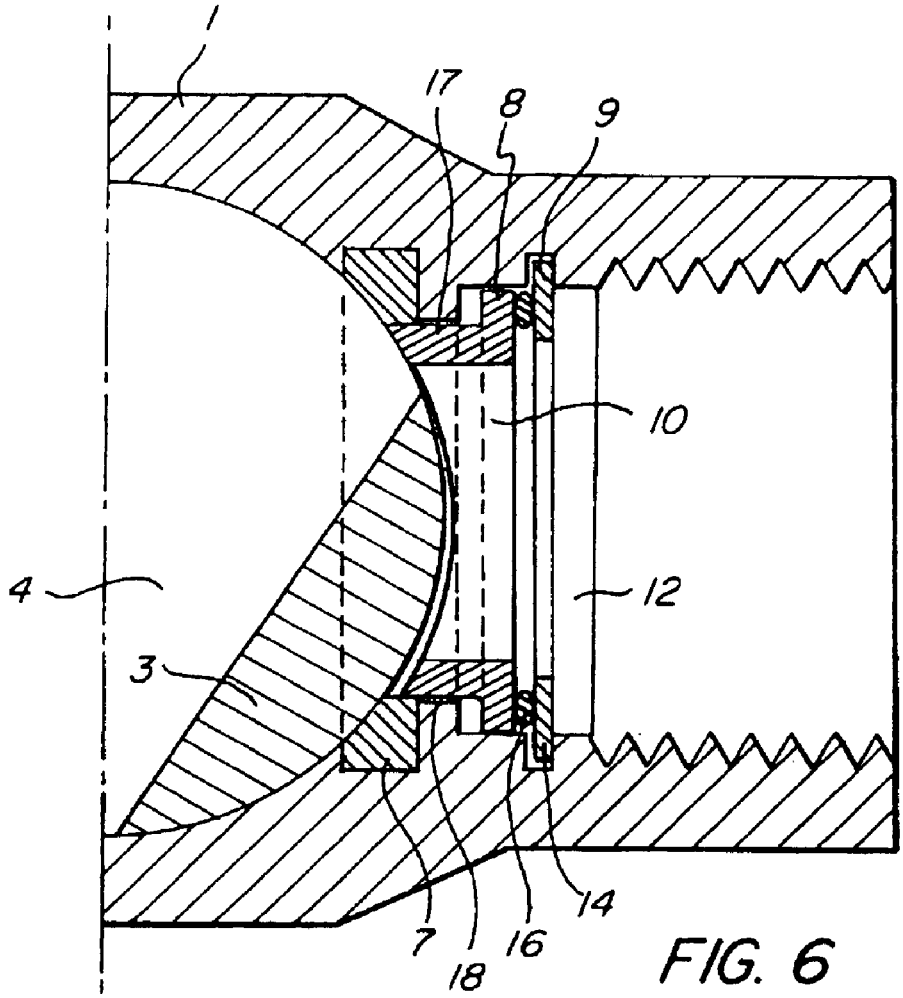
FIG. 6 is a partially broken away top cross-section view of another preferred embodiment of a valve 102 similar to that of valve 100 of FIG. 1, showing a disk 8 that is cantered.

An additional alternative embodiment is shown in FIG. 6 and represented by reference numeral 102. It utilizes a disk 8 that is cantered because it is slightly thicker at one end 17. Because the disk 8 is slightly thinner at one end 18, and the movement of the disk 8 is very small, the thinner end 18 will not reach into the hole 4 in the ball 3, so when the ball 3 is turned back, the disk 8 will be pushed back out again by a "wedge" action. In the embodiment of FIG. 6, the turning movement of the ball 3 should be limited, so it can not be moved beyond the fully open and the fully closed positions.

Figure 7:
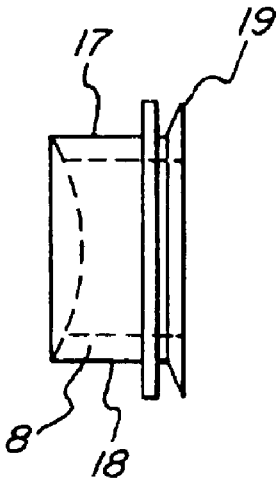
FIG. 7 is a side plan view of another preferred embodiment of disk 8, wherein the side of the disk 8 that is intended to make contact with ring 9 is shaped as a flexible flange 19.

The fact that the disk 8 at at least one end 17 rests upon the ball 3 improves the rangeability of the valve (the clearance will be zero, so the unwanted flow at the start point will be minimal, where it is the most important). Preferably, there is a spring action between the disk 8 and the retaining ring 9. This can be accomplished by use of an O-ring 16. FIG. 7 shows another alternative embodiment where the disk 8 is of a semi-resilient material and the end 19 that is in contact with the retaining ring 9 is shaped as a flange 19, thus providing a limited spring action. It is also possible to have a retaining ring 9 that is flexible and provides some spring action. This can be accomplished by use of a wave shaped, beveled or slightly conical retaining ring 9. Instead of using a retaining ring 9, a short ring with an outside diameter that is threaded to fit the inside diameter of the connecting ports can be used. It is important that sufficient space remains for the connecting fluid pipe line. The spring action can be provided by an O-ring, a spring washer or a flexible flange.

The above text refers to "two piece" ball valves. However, the invention can also be applied to "three piece" ball valves, as well as plug valves. The valve 100, 102, 106 according to the invention offers at least the following advantages:

1. The disk can be designed so the flow capacity (CV-value) is reduced to a desired value. For example, using the same sequence of CV-values that is typical for HVAC control valves of a globe type.
2. The disk can be designed to provide equal percent flow characteristics or any other suitable flow characteristics.
3. A standard low cost ball valve can be used. The only modification of the basic valve is the groove 14 and the optional recess 15.
4. The disk 8 can be installed or replaced without taking the valve apart.
5. The seats 6 and 7 are not interfered with. The factory adjusted tension and the integrity of the valve remains intact.
6. Because the seats 6 and 7 and the disk 8 are separate parts, each part can be optimized to its function without regard to the other parts.
7. Small inexpensive ball valves are commonly replaced by new valves when the seats are worn out. Because the disk 8 is removable, it is possible to keep the disk 8 and use it in the replacement valve. In doing so, the new valve will have the same flow coefficient and characteristics as the old valve.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention as defined in the appended claims. The claims are meant to cover the claimed components in any arrangement which is effective to meet the objectives there intended, unless the context specifically indicates the contrary.

What is claimed is:

1. A valve of the type having a casing provided with openings to be connected to a fluid pipe line, wherein at least one of the casing openings forms a groove and having a valve chamber therein with at least one inlet and outlet port for defining a fluid flow path through the valve chamber, the valve comprising:

a plug mounted in the valve chamber and having an exterior surface and two ends and a fluid flow passageway extending between the ends and through the plug, the plug having an axis of rotation extending transverse to the direction of the fluid flow passageway, the plug being rotatable about the axis of rotation for selectively turning the plug between an open position in which the fluid flow passageway is disposed along the fluid flow path between the inlet and outlet ports and a closed position in which the fluid flow passageway is disposed transverse to the fluid flow path;

a disk having an opening therein, the disk located inside at least one of the inlet or outlet ports, the disk having at least two sides, wherein one of its sides closely conforms with and interfaces with the exterior surface of the plug, wherein the opening of the disk interacts with the fluid passageway extending between the ends of the plug so that different flow characteristics are achieved when the plug is moved between the open and closed positions; and an internal retaining ring sized and shaped to fit at least partially inside the groove, wherein the disk is retained by the internal retaining ring which is at least partially recessed into the groove in one of the casing openings.

2. The valve of claim 1, wherein the disk opening is essentially V-shaped.

3. The valve of claim 1, the disk comprising a key, the casing comprising a member for cooperating with the disk key, wherein the disk key mates with the cooperating member of the casing.

4. A valve of the type having a casing provided with openings to be connected to a fluid pipe line, wherein at least one of the casing openings forms a groove and having a valve chamber therein with at least one inlet and outlet port for defining a fluid flow path through the valve chamber, the casing further comprising a cooperating member, the valve comprising:

a ball mounted in the valve chamber and having an exterior surface and two ends and a fluid flow passageway extending between the ends and through the ball, the ball having an axis of rotation extending transverse to the direction of the fluid flow passageway, the ball being rotatable about the axis of rotation for selectively turning the ball between an open position in which the fluid flow passageway is disposed along the fluid flow path between the inlet and outlet ports and a closed position in which the fluid flow passageway is disposed transverse to the fluid flow path;

a disk having an essentially V-shaped opening therein, the disk located inside at least one of the inlet or outlet ports, the disk having at least two sides, wherein one of its sides closely conforms with and interfaces with the exterior surface of the ball, the disk comprising a key, wherein the disk key mates with the cooperating member of the casing, wherein the opening of the disk interacts with the fluid passageway extending between the ends of the ball so that different flow characteristics are achieved when the ball is moved between the open and closed positions; and an internal retaining ring sized and shaped to fit at least partially inside the groove, wherein the disk is retained by the internal retaining ring which is at least partially recessed into the groove in one of the casing openings.

5. The valve of claim 4, wherein the disk is spring loaded and presses against the ball exterior surface.

6. A valve of the type having a casing having at least two parts one of which is screwed into the other and provided with openings to be connected to a fluid pipe line and having a valve chamber therein with at least one inlet and outlet port for defining a fluid flow path through the valve chamber, the valve comprising:

a plug mounted in the valve chamber and having an exterior surface and two ends and a fluid flow passageway extending between the ends and through the plug which is suspended between two seat rings, the plug having an axis of rotation extending transverse to the direction of the fluid flow passageway, the plug being rotatable about the axis of rotation for selectively turning the plug between an open position in which the fluid flow passageway is disposed along the fluid flow path between the inlet and outlet ports and a closed position in which the fluid flow passageway is disposed transverse to the fluid flow path; and a disk having an opening therein, the disk located inside at least one of the inlet or outlet ports, the disk having at least two sides, wherein one of the sides of the disk closely conforms with and interfaces with the exterior surface of the plug, and wherein the opening of the disk interacts with the fluid passageway extending between the ends of the plug so that different flow characteristics are achieved when the plug is moved between the open and closed positions, and further wherein at least one of the casing openings further comprises a groove and an internal retaining ring sized and shaped to fit at least partially inside the groove, wherein the disk is retained by the internal retaining ring which is at least partially recessed into the groove in one of the casing openings.

7. The valve of claim 6, wherein one of the sides of the disk is concave and has a diameter not greater than the inside diameter of the seat rings.

8. The valve of claim 6, wherein one of the sides of the disk has a diameter not greater than the inside diameter of the inlet and outlet ports.

9. The valve of claim 6, wherein the casing comprises a recess into which the disk fits and further wherein each seat ring is located inside a dedicated recess separate from the recess for the disk.

* * * * *